US008483999B2

(12) United States Patent
Shmoylova et al.

(10) Patent No.: US 8,483,999 B2
(45) Date of Patent: Jul. 9, 2013

(54) METHOD AND SYSTEM FOR SIMPLIFYING MODELS

(75) Inventors: Elena Shmoylova, Waterloo (CA); Jurgen Gerhard, Waterloo (CA); Erik Jelle Postma, Waterloo (CA); Austin Duncan Roche, Waterloo (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 222 days.

(21) Appl. No.: 13/004,330

(22) Filed: Jan. 11, 2011

(65) Prior Publication Data

US 2012/0179437 A1 Jul. 12, 2012

Related U.S. Application Data

(60) Provisional application No. 61/415,094, filed on Nov. 18, 2010.

(51) Int. Cl.
*G06F 17/10* (2006.01)
(52) U.S. Cl.
USPC .......................................... 703/2
(58) Field of Classification Search
USPC .......................................... 703/2
See application file for complete search history.

(56) References Cited

U.S. PATENT DOCUMENTS

| | | | |
|---|---|---|---|
| 6,349,272 B1 | 2/2002 | Phillips | |
| 7,035,782 B2 | 4/2006 | Yang et al. | |
| 7,246,056 B1 | 7/2007 | Brewton | |
| 7,272,543 B2 | 9/2007 | Estevez-Schwarz et al. | |
| 7,398,192 B2 | 7/2008 | Brewton | |
| 7,415,395 B2 * | 8/2008 | Khan | 703/2 |
| 7,490,026 B2 | 2/2009 | Reissig | |
| 7,904,280 B2 * | 3/2011 | Wood | 703/2 |
| 2004/0210426 A1 | 10/2004 | Wood | |

OTHER PUBLICATIONS

Linda R. Petzold et al., "ODAE methods for the numerical solution of Euler-Lagrange equations," 1992, Applied Numerical Mathematics, vol. 10, pp. 397-413.*
Peter Kunkel et al., "Differential-Algebraic Equations," 2006, European Mathematical Society, pp. 167-182.*
Jan Bakus et al., "High-level physical modeling description and symbolic computing," 2008, Proceedings of the 17th World Congress The international Federation of Automatic Control, pp. 1054-1055.*
Sebastian Reich, "On a geometrical interpretation of differential-algebraic equations," 1990, Circuits, Systems, and Signal Processing, vol. 9, No. 4, pp. 367-382.*
Patrick J. Rabier et al., "A geometric treatment of implicit differential-algebraic equations," 1991, University of Pittsburgh, pp. 1-44.*
W.C. Rheinboldt, "On the theory and numerics of differential-algebraic equations," 1990, University of Pittsburgh, pp. 1-38.*

(Continued)

*Primary Examiner* — Dwin M Craig
*Assistant Examiner* — Russ Guill
(74) *Attorney, Agent, or Firm* — Gifford, Krass, Sprinkle, Anderson & Citkowski, P.C.

(57) ABSTRACT

An example method of simplifying a system expressed as differential algebraic equations includes transforming the differential algebraic equations into Hessenberg form, the Hessenberg form including algebraic equations and differential equations, using the algebraic equations to express a constraint manifold, and using a combination of differentiation and projections onto the normal and tangential spaces of the constraint manifold to simplify the differential equations.

11 Claims, 2 Drawing Sheets

OTHER PUBLICATIONS

Eberhard Griepentrog, "Index reduction methods for differential-algebraic equations," 1991, Humboldt University, pp. 1-16.*

D. Scott, "Can a projection method of obtaining equations of motion compete with Lagrange's equations?", Am. J. Phys. 56, 451-456 (1988).

K. Arczewski, W. Blajer, "A unified approach to the modeling of holonomic and nonholonomic mechanical systems," Mathematical Modeling of Systems 2, 157-174 (1996).

A. Ohata, A. Sugiki, Y. Ohta, S. Suzuki, K. Furuta, "Engine Modeling Based on Projection Method and Conservation Laws," Proc. 2004 IEEE International Conference on Control Applications, 1420-1424.

A. Raksanyi et al., "Identifiability and Distinguishability Testing Via Computer Algebra," Mathematical Biosciences, 77(1-2), 245-266, 1985.

M. Arnold, "Numerical problems in the dynamical simulation if wheel-rail systems," Z. Agnew. Math Mech., Proceedings ICIAM 95, Issue 3, pp. 151-154, 1996.

"Numerical Solution of Differential Algebraic Equations," Claus Bendtsen and Per Grove Thomsen, Editors. IMM Department of Mathematical Modelling, Technical University of Denmark, May 6, 1999.

Griepentrog, E., "The Numerical Treatment of the Motion Equations of Mass Point Systems," Z. Agnew. Math Mech., 71 7/8, 297-298, 1991.

Kozen, D., Landau, S., "Polynomial decomposition algorithms," J. Symbolic Computation 7, 445-456 (1989).

Kozen, D., Landau, S., Zippel, R., "Decomposition of algebraic functions," J. of Symbolic Computation, 22(3), 235-246 (1996).

J. von zur Gathen, J. Gutierrez, R. Rubio, "Multivariate polynomial decomposition," AAECC 14, 11-31 (2003).

J. von zur Gathen, "Functional Decomposition of Polynomials: the Wild Case," J. of Symbolic Computation, 10, 437-452 (1990).

J. von zur Gathen, "Functional Decomposition of Polynomials: the Tame Case," J. of Symbolic Computation, 9, 281-299 (1990).

L. Ljung, T. Glad, "On Global Identifiability for Arbitrary Model Parametrizations," Automatica 30(2), 265-276 (1994).

R. Zippel, "Rational Function Decomposition," Paper presented at the International Symposium on Symbolic and Algebraic Computing, Bonn, Germany, Jul. 14, 1991.

W. Blajer, A projection method approach to constrained dynamic analysis, J. Appl. Mech. 59 (1992), 643-649.

W. Blajer, Elimination of constraint violation and accuracy aspects in numerical simulation of multibody systems, Multibody System Dynamics, 7, (2002), 265-284.

W. Blajer and K. Kolodziejczyk, "A Geometric Approach to Solving Problems of Control Constraints: Theory and a DAE Framework," Multibody System Dynamics 11 (2004), 343-364.

E. Buckingham, "On Physically Similar Systems: Illustrations of the Use of Dimensional Equations," vol. IV, No. 4, 345-376, (1914)—reprinted from http://stuff.mit.edu/afs/athena/course/other/beh.410/www/Handouts/buckingham.pdf.

Jean-Charles Faugere and Ludovic Perret, "Cryptanalysis of 2R-Schemes," CRYPTO 2006, LNCS 4117, pp. 357-372, 2006.

S. Li, L. Petzold, "Software and algorithms for sensitivity analysis of large-scale differential algebraic systems," J. of Computational and Applied Mathematics, 125 (2000) 131-145.

* cited by examiner

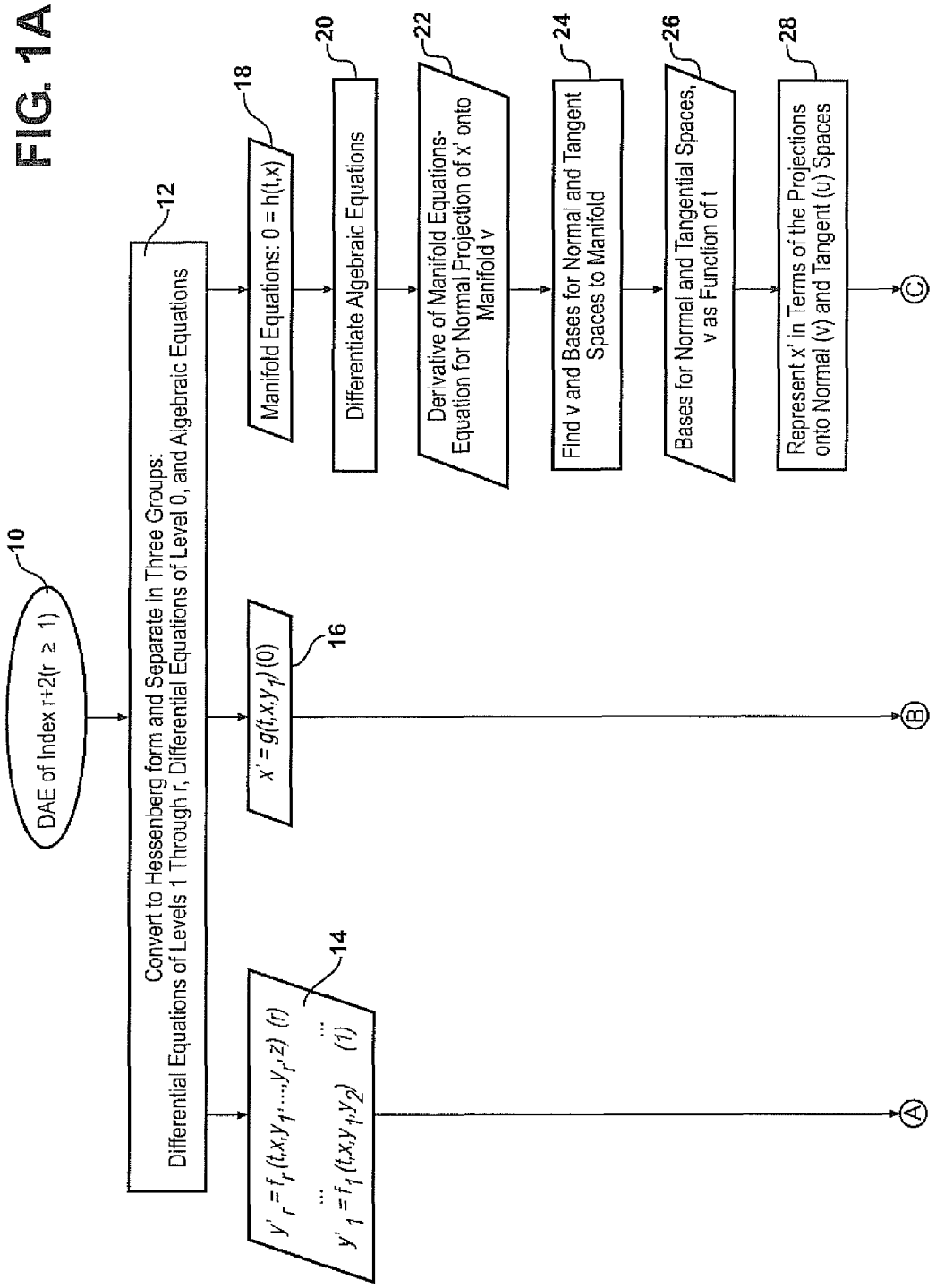

METHOD AND SYSTEM FOR SIMPLIFYING MODELS

CROSS-REFERENCE TO RELATED APPLICATIONS

This application claims priority to U.S. Provisional Application No. 61/415,094, filed on Nov. 18, 2010.

FIELD OF THE INVENTION

The present invention relates to a method for simplifying a model expressed as a system of differential algebraic equations (DAE).

DESCRIPTION OF THE PRIOR ART

Systems may be modeled as mathematical expression to enable the system to be tested. Modeling systems is particularly useful during the design process as these mathematical expressions allow the system to be tested before a prototype is produced. Specifically, modeling the system allows an engineer to see how a system performs, for example mechanical systems such as engines under various loads and under environmental factors.

Systems may be expressed symbolically using variables which show how the system behaves. This allows an engineer to test how the system responds under certain conditions. Thus, the system may be subject to various conditions before a prototype is built. The conditions may be expressed in variables which represent the behavior of the system while other variables represent forces on the system which enforce the conditions on the system.

For example, some of the variables may represent external forces such as friction, heat, and the like. Accordingly, these variables may depend on other factors such as time, or another condition of the model. Thus, taking into account the internal behavior of the system and the external forces acting on the system, the system may be expressed in a system of differential algebraic equations.

The expression of a system may include numerous algebraic variables and differential variables. Processing such an expression may be time consuming. Accordingly, it is desirable to reduce the number of algebraic variables and differential variables within the system, simplifying the system.

Accordingly, it is highly desirable to have a method of reducing the number of algebraic and differential variables; and algebraic and differential equations, in a mathematical model of a system so as to reduce the processing time required to solve these systems numerically.

SUMMARY OF THE INVENTION

Examples of the present invention relate to methods for simplifying models expressed as a system of differential algebraic equations (DAEs). Reduction of model represented by DAEs to a system of ordinary differential equations (ODEs) facilitates solving the model numerically. Once ODEs are obtained, any appropriate ODE solution approach can be used to obtain a numerical solution of the model. Examples of the present invention simplify the reduction of DAEs to an ODE system, e.g. by reducing the number of differential and/or algebraic variables.

Examples of the present invention include combining index reduction with projection onto the constraint manifold. Index reduction benefits from the projection approach for DAEs of various forms, in particular DAEs that appear in the application of optimization under constraints. Projecting the model onto the normal and tangent spaces of the constraint manifold allows the elimination of algebraic and/or differential variables, simplifying the model.

Applications include simplification and numerical solution of models of various physical systems, such as models of mechanical systems such as engine models, models of electrical systems such as electrical circuit models, and the like. For any physical system, mathematical models are derived based on the relevant physical laws. Constraints may represent natural conditions imposed on the system by the physical laws.

In a computational environment including at least one processor, an example method of simplifying a model of a physical system expressed as DAEs includes differentiating the algebraic equations to produce bases for a normal space and a tangent space of the constraint manifold, and reducing the number of differential variables and/or algebraic variables in the model using index reduction of the differential equations combined with projection of the differential equations onto the normal and tangent spaces.

In engineering development, prototyping and testing can be replaced by virtual modeling and simulation. A physical system can be represented by a mathematical model within a software modeling and simulation environment, and such models often include DAEs that are solved numerically. Simulation can be achieved on a computer for various scenarios. Improved simulation approaches allow more rapid development and prototyping. In the early stages at least, prototyping using physical objects (such as engine components or electronic components) can be replaced by virtual modeling. Hence, improved simulations allow more rapid development of products or processes. Any approach that reduces the computational demands of finding a numerical solution, and hence reduces simulation times, allows more extensive use of virtual modeling. This reduces product development times, and hence improved numerical solution approaches are of considerable value and interest in a variety of technical fields.

BRIEF DESCRIPTION OF THE DRAWINGS

FIGS. 1A-1B illustrate an example method of the present invention.

DETAILED DESCRIPTION OF THE INVENTION

Figure 1B:
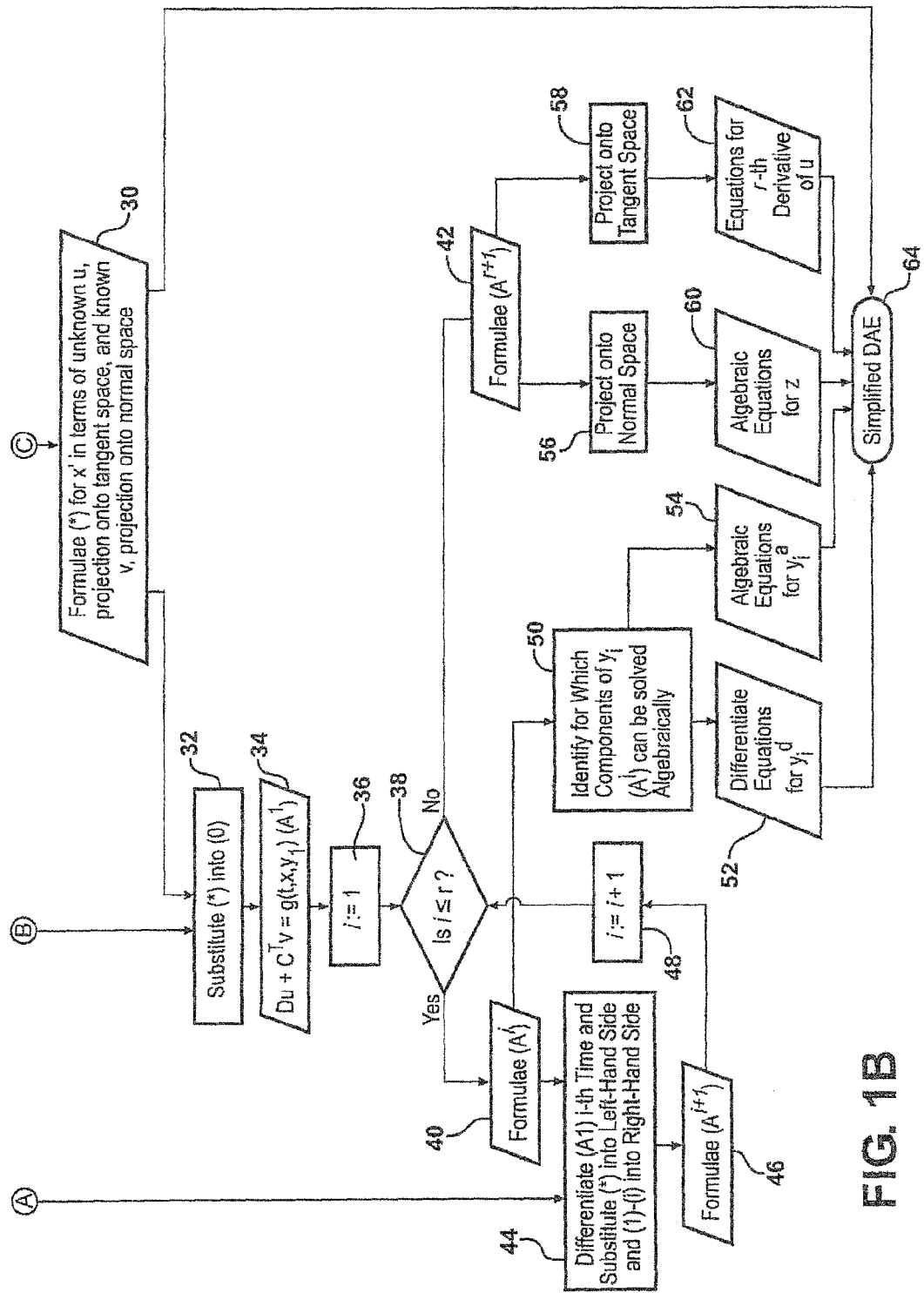

Examples of the present invention relate to a method for simplifying a mathematical model of a system. Computer simulations of physical systems often require the numerical solution of a model. Simplification of DAEs to ordinary differential equations (ODEs), which can then be solved numerically, is very useful for dynamical modeling and simulation applications. Applications include improved modeling of physical systems, such as constrained mechanical systems, electrical circuits, models generated using high level modeling tools, and optimization problems constrained by one or more physical laws. However, the approaches described are not limited to any particular system.

An example method for numerically solving a model in the form of a differential algebraic equations (DAEs) includes expressing the DAEs in Hessenberg form, providing representations of the algebraic equations as a constrained manifold, determining the normal and tangential spaces of the manifold, and projecting the system onto the tangential and normal spaces of the manifold so as to reduce the number of algebraic and differential variables in the expressed system.

A DAE system can be simplified by projecting the system onto normal and tangential spaces of the constraint manifold, and solving the projected system symbolically so as to reduce the number of differential and algebraic variables within the DAEs.

According to an example of the present invention, a method of model simplification include transforming the DAE into Hessenberg form, considering the algebraic equations as a constraint manifold, finding the normal and tangential spaces to the constraint manifold, projecting the system onto the normal and tangential spaces, where possible solving algebraic equations found by the normal projection, and using the tangential projection to give ODEs with fewer unknowns than the original system.

A DAE expressed in its most general form may not be immediately suitable for simplification using a projection method. However, expression in Hessenberg form allows projection and index reduction to be combined.

Examples of the invention may be achieved using a computer, including a processing unit and associated components, for example executing a Hessenberg transformation algorithm operable to transform the DAE into Hessenberg form.

Hessenberg Index-1

The general form of a Hessenberg Index-1 may be expressed as follows:

$$\dot{x} = f(t,x,z)$$

$$0 = h(t,x,z) \quad (1)$$

wherein $x=x(t)=(x_1(t), \ldots, x_n(t))^T$ is the vector of differential variables $f=(f_1, \ldots, f_n)^T$, and $z=z(t)=(z_1(t), \ldots, z_k(t))^T$ is the vectors of algebraic variables $h=(h_1, \ldots, h_k)^T$, and the Jacobian $\partial h/\partial z$ is nonsingular for all t.

In what follows, we consider a Hessenberg form, which is reduced to an index 1 by differentiation. The reduced Hessenberg form, meaning herein a Hessenberg form reduced to an index of 1, as in Equation (1), is then examined to determine if projecting the system will result in a reduction of algebraic variables and differential variables. Projecting or projection used herein describes the process whereby the system is projected onto the normal and tangential spaces of the constraint manifold. Naturally, some systems may have a higher index than others. Accordingly, each system must be evaluated to determine if projection will reduce the number of differential and algebraic variables of the system.

Hessenberg Index-2

A method for simplifying a system of DAEs, having an index of 2 or higher, comprises simplifying the system by projecting the system onto normal and tangential spaces of the constraint manifold, and solving the projected system symbolically so as to reduce the number of differential and algebraic variables. This may be achieved using a computer, for example a computer including a processing unit executing a Hessenberg transforming program operable to transform the DAEs into Hessenberg form.

Systems having an index of 2 are generally expressed in Hessenberg form as:

$$\dot{x} = f(t,x,z)$$

$$0 = h(t,x) \quad (2)$$

where x, z, f, and h are defined as above for the index-1 form of Equation 1, and the product of Jacobians $$\frac{\partial h}{\partial x} \frac{\partial f}{\partial z}$$

is nonsingular for all t.

Reducing system (2) to an index of 1 requires the differentiating the expression once, so as to obtain the equation $$0 = \frac{\partial h(t,x)}{\partial x} \dot{x} + \frac{\partial h(t,x)}{\partial t} \quad (3)$$

Accordingly, the reduced system (2) may be rewritten with equation (3) so as to obtain:

$$\dot{x} = f(t,x,z), \quad (4)$$

$$0 = \frac{\partial h(t,x)}{\partial x} f(t,x,z) + \frac{\partial h(t,x)}{\partial t}$$

System (4) is in reduced form, meaning it is now in Hessenberg index-1. Simplification of system (2) begins by projecting system (4) onto the space normal and tangential to the constraint manifold. $0=h(t,x)$ defines a time varying constraint manifold M(t) in the n-dimensional vector space of the differential variables. In order for the differential variables to stay on the constraint manifold for every t, $\dot{x}$ must be tangent to M(t) for every t. The matrix whose rows span the normal space of the constraint manifold is referenced herein as "C." Since the Hessenberg form has an index of 2, $$\frac{\partial h}{\partial x} \frac{\partial f}{\partial z}$$

is nonsingular and the matrix "C" is of maximal row-rank. The relationship may be expressed as $$C = \frac{\partial h}{\partial x}.$$

Differentiating the constraint manifold with respect to time yields $$C\dot{x} + \frac{\partial h}{\partial t} = 0.$$

Describing the projection of $\dot{x}$ onto the tangent space may be done by introducing a matrix D such that D is of maximal column-rank and CD=0. The columns of D define the space which is orthogonal to the space spanned by the rows of C. Thus, for any t, the matrix C and D provide two subspaces of $R^n$, spanned by C and D, that are orthogonal complements of each other. By the theorem on orthogonal decomposition, any element $R^n$ can be represented as a sum of projections onto these subspaces. Consequently, for any t, the derivatives of differential variables may be written as:

$$\dot{x} = Du + C^T v \quad (5)$$

for certain vectors $u \in R^k$, wherein "u" is the tangential component and "v" is the normal component of $\dot{x}$.

Accordingly, the normal component "v" of $\dot{x}$ may be obtained by differentiating with respect to time the constraint manifold and then projecting the result onto the normal space spanned by the rows of C, achieving the following expression:

$$v = -(CC^T)^{-1}\frac{\partial h}{\partial t} \tag{6}$$

The normal component "u" of $\dot{x}$ may be obtained by projecting the DAE ($\dot{x}$=f(t,x,z)) onto the tangential space spanned by the columns of D and substituting the representation of $\dot{x}$ as a sum of the projections onto the normal and tangential spaces of the manifold to achieve the following expression:

$$u=(D^TD)^{-1}D^Tf(t,x,z) \tag{7}$$

Substituting the expressions for the normal and tangential components (5) and (6) into system (4) yields:

$$\dot{x} = D(D^TD)^{-1}D^Tf(t,x,z) + C^T\left(-(CC^T)^{-1}\frac{\partial h}{\partial t}\right), \tag{8}$$

$$0 = Cf(t,x,z) + \frac{\partial h}{\partial t}.$$

where the first subsystem of the system is decomposed into the sum of tangent and normal components.

Accordingly, the decomposed system (8) has the same number of equations and variables as the originally expressed DAE. However, when f(t,x,z)=$C^T\phi$(t,x,z) for a function $\phi$, f may be represented by a product of an arbitrary (n-k)-dimensional vector-valued function dependent on t, x, and z and the transpose of the matrix C, and the system (8) may be simplified, meaning the number of algebraic equations and differential variables may be reduced. Specifically, substituting f(t,x,z)=$C^T\phi$(t,x,z) reduces system (8) to:

$$\dot{x}=C^Tv, $$

$$0=\phi(t,x,z)-v \tag{9}$$

where Equation 9(b) can be solved with respect to z, and v is given by (6). Accordingly, projection simplifies system (2) when the above conditions are apparent. Specifically, system (4) has been split into a system of ordinary differential equation and a system of algebraic equations.

Though the above case was very specific, projection may simplify a broader class of system (2). Specifically, projection of system (2) where at least one of the algebraic constraints in the vector of differential variables is linear, projecting the system onto the normal and tangential spaces spanning the constraint manifold will reduce the number of algebraic variables and differential variables of the system, wherein the system is of the form:

$$\dot{x}=f(t,x,z), $$

$$0=C_1(t)x+\alpha(t), $$

$$0=h_2(t,x), \tag{10}$$

where $C_1$ is an l×n matrix of maximal row-rank, meaning that 1≦n, and $h_2$ is a (k-l)-dimensional vector function which is nonlinear in x, where l as used herein refers to the number of rows of $C_1$ and n refers to the number of columns of $C_1$.

We introduce a matrix $D_1$ of maximal column-rank such that $C_1 D_1$=0. Thus, as the rows of $C_1$ span a subspace in $R^N$ for every t, it follows that the columns of $D_1$ span the orthogonal complement to the subspace spanned by $C_1$, and any x∈$R^N$ can be represented as $$x=D_1\chi+C_1^T\Psi, \tag{11}$$

where $\chi=(\chi_1,\ldots,\chi_{n-l})^T$ represents projection of x onto the tangential space of the manifold formed by the linear constraints, and $\Psi=(\Psi_1,\ldots,\Psi_l)^T$ represents projection onto normal space of the manifold formed by the linear constraints. Substituting (11) into 0=$C_1$(t)x+$\alpha$(t) of (10) and making use of the relation $C_1D_1$=0, $\Psi$ may be solved for, where $\Psi=-(C_1C_1^T)^{-1}\alpha$. From (11) we can solve for $\dot{x}$, wherein $$\dot{x}+\dot{D}_1\chi+D_1\dot{\chi}+\dot{C}_1^T\Psi+C_1^T\dot{\Psi} \tag{12}$$

The differential equation for $\dot{\chi}$, the only unknown part of $\dot{x}$ after projection, may be derived by substituting (12) into $\dot{x}$=f(t,x,z) and left-multiplication by $D_1^T$, where $$\dot{\chi}=(D_1^TD_1)^{-1}D_1^T[f(t,D_1\chi+C_1^T\Psi,z)-\dot{D}_1\chi-\dot{C}_1^T\Psi] \tag{13}$$

In expression (13), z is unknown. However, z may be found by differentiating algebraic equations 0=$C_1$(t)x+$\phi$(t), and 0=$h_2$(t,x), so as to obtain $$C\dot{x}+\eta = 0, \tag{14}$$

where $$C=\begin{pmatrix} C_1 \\ \frac{\partial h_2}{\partial x} \end{pmatrix} \text{ and }$$

$$\eta=\begin{pmatrix} \dot{C}_1 x+\dot{\alpha} \\ \frac{\partial h_2}{\partial t} \end{pmatrix}.$$

On the other hand, left-multiplying $\dot{x}$=f(t,x,z) by C yields:

$$C\dot{x}=Cf \tag{15}$$

Using equations (14) and (5), an expression for z may be obtained where z is solvable because $$\begin{pmatrix} C_1 \\ \frac{\partial h_2}{\partial x} \end{pmatrix}\frac{\partial f}{\partial z}$$

is a nonsingular matrix. Specifically, the combination of equations (13) and (14) yields the expression:

$$Cf(t,D_1\chi+C_1^T\Psi,z)+\eta(t,D_1\chi+C_1^T\Psi)=0 \tag{16}$$

Thus the DAE having n number of differential variables and k number of algebraic variables is simplified to the DAE system described in equations (13) and (16), which has n−l differential variables, where l is the number of linear constraints, and k is a number of algebraic variables.

Accordingly, projection simplifies a system, where the system is in the form (10), and where $\Psi=-(C_1C_1^T)^{-1}\alpha$. Using the relationship $C_1D_1$=0, $D_1$ may be found symbolically, and thus simplified DAEs (13) and (16) may be numerically solved for $\chi$ and z, allowing x to be known using $\Psi$ and $\chi$ in x=$D_1\chi+C_1^T\Psi$.

Hessenberg Index-3

Simplification of a DAE having a higher index is also possible using projection. It is known that a Hessenberg index-3 may be generally expressed as follows:

$$\dot{y}=f(t,x,y,z),$$

$$\dot{x}=g(t,x,y),$$

$$0=h(t,x) \qquad (17)$$

where $y=y(t)=(y_1(t), \ldots y_m(t))^T$ and $x=x(t)=(x_1(t), \ldots x_n(t))^T$ are the vectors of differential variables, $f=(f_1, \ldots, f_m)^T$, $g=(g_1, \ldots, g_n)^T$ are known vector functions, representing differential equations, $z=z(t)=z_1(t), \ldots z_k(t)^T$ is the vector of algebraic variables, $h=(h_1, \ldots, h_k)^T$ is a known vector function representing algebraic equations and the product of the Jacobians $$\frac{\partial h}{\partial x}\frac{\partial g}{\partial y}\frac{\partial f}{\partial z}$$

is nonsingular for all t.

Thus, $\dot{y}=f(t,x,y,z)$ (Equation 17a) and $\dot{x}=g(t,x,y)$ (17b) are two different types of differential equations, and $0=h(t,x)$ (17c) is a set of algebraic equations defining the constraint manifold. Reduction of the Hessenberg index-3 form to index 1 consists of two differentiations of the system (17) and projecting the second differentiation onto the normal and tangential spaces of the constraint manifold.

Specifically, $\dot{x}=g(t,x,y)$, and $0=h(t,x)$ of (17) are differentiated and then projected. As before, projection is achieved by introducing the tangential and normal spaces of the constrained manifold so as to yield expressions (5) and (6)

Differentiating $\dot{x}=g(t,x,y)$, yields $$\ddot{x} = \frac{\partial g}{\partial t} + \frac{\partial g}{\partial x}g + \frac{\partial g}{\partial y}f \qquad (18)$$

Accordingly, using (5), (18) may be expressed as:

$$\dot{D}u + D\dot{u} + \dot{C}^T v + C^T \dot{v} = \frac{\partial g}{\partial t} + \frac{\partial g}{\partial x}g + \frac{\partial g}{\partial y}f \qquad (19)$$

Next, expression (19) is also projected onto the tangential space. This may be done by left-multiplying expression (19) by $D^T$, resulting in $$D^T\dot{D}u + D^TD\dot{u} + D^T\dot{C}^T v = D^T\frac{\partial g}{\partial t} + D^T\frac{\partial g}{\partial x}g + D^T\frac{\partial g}{\partial y}f \qquad (20)$$

Since D is of maximal column-rank, we can express $\dot{u}$ in terms of t, x, y, and u. Thus, "v" is known from (6), and u may be derived from differential equation (20).

However, the term "y" remains unknown, which may be referred to as a level-1 differential variable, described further below, and may be eliminated if represented in terms of t, x, and u. This may be done by substituting the representation (5) of $\dot{x}$ into (17b) $\dot{x}=g(t,x,y)$, accordingly it follows that:

$$\dot{x}=Du+C^Tv=g(t,x,y) \qquad (21)$$

Assuming that the Jacobian $\partial g/\partial y$ is invertible for any t, and the number of components in vector x is equal to the number of components in y, expression (21) may be solved uniquely for y. Thus, the only unknown variable remaining is z. Later, a generalized approach is introduced that does not require these assumptions.

In order to reduce the Hessenberg form to an index 1, the method proceeds to the step of obtaining an algebraic equation solvable for z. The algebraic equation may be obtained by projecting (19) onto the normal space. In order to obtain $\dot{C}$ and $\dot{v}$, system (17c) is differentiated a second time. Thus, the following index 1 DAEs may be obtained utilizing the expressions (6), (19), (20), and (21), as follows:

$$\dot{x} = Du + C^T v, \qquad (22)$$

$$\dot{u} = (D^TD)^{-1}D^T\left[\frac{\partial g}{\partial t} + \frac{\partial g}{\partial x}g + \frac{\partial g}{\partial y}f - \dot{D}u - \dot{C}^T v\right],$$

$$0 = Du + C^T v - g,$$

$$0 = \dot{C}g + C\left[\frac{\partial g}{\partial t} + \frac{\partial g}{\partial x}g + \frac{\partial g}{\partial y}f\right] + \frac{\partial^2 h}{\partial t^2} + \frac{\partial^2 h}{\partial x \partial t}g$$

where "v" is given by expression (6). The projected expression of the reduced Hessenberg form has 2n−k differential variables, "x" and "u", and n+k algebraic variables, "y" and "z".

As with the case above wherein projection may be used to reduce the number of differential and algebraic variables in the system, the number of algebraic variables and differential variables may also be reduced by projecting system onto the normal and tangential subspaces of the constraint manifold of the system where at least one algebraic constraint in the vector of differential variables is linear.

A method pertaining to a DAE having an index of 3, when some constraints are linear, is now described where the Hessenberg index-3 system is of the form:

$$\dot{y}=f(t,x,y,z),$$

$$\dot{x}=g(t,x,y),$$

$$0=C_1(t)x+\alpha(t),$$

$$0=h_2(t,x), \qquad (23)$$

where $C_1$ is an l×n matrix of maximal row rank, such that $1 \leq n$, and $h_2$ is a (k−l)-dimensional vector function which is non-linear in x.

Subsystems $\dot{x}=g(t,x,y)$, $0=C_1(t)x+\alpha(t)$, and $0=h_2(t,x)$ may be rewritten to take into consideration the normal and tangential component of the vector of differential variables, as expressed in equation (11), where the vector $\Psi$ is given by $\Psi=-(C_1C_1^T)^{-1}\alpha$. The equation for $\chi$, derived from (13), is:

$$\dot{\chi}=(D_1^TD_1)^{-1}D_1^T[g(t,D_1\chi+C_1^T\Psi,y)-\dot{D}_1\chi-\dot{C}_1^T\Psi] \qquad (24)$$

Accordingly, it follows that subsystem (22a) $\dot{\chi}$ may be replaced with (24). Thus system (23) may be reduced to:

$$\dot{\chi} = (D_1^TD_1)^{-1}D_1^T[g - \dot{D}_1\chi - \dot{C}_1^T\psi], \qquad (25)$$

$$\dot{u} = (D^TD)^{-1}D^T\left[\frac{\partial g}{\partial t} + \frac{\partial g}{\partial x}g + \frac{\partial g}{\partial y}f - \dot{D}u - \dot{C}^T v\right],$$

$$0 = Du + C^T v - g,$$

-continued $$0 = \dot{C}g + C\left[\frac{\partial g}{\partial t} + \frac{\partial g}{\partial x}g + \frac{\partial g}{\partial y}f\right] + \frac{\partial^2 h}{\partial t^2} + \frac{\partial^2 h}{\partial x \partial t}g,$$

Accordingly, system (25) has (2n−k−l)-differential variables χ and u and n+k algebraic variables y and z.

Projection may also simplify a Hessenberg Index-3 DAE where the subsystem, $0=Du+C^Tv-g$ in system (22) or (25) is solvable for "y" symbolically.

In the Hessenberg Index-3 case, there are two different classes of differential variables, represented by variables "x" and "y." The variables "x" represent differential variables that appear in the algebraic equations of the system and such that there are no algebraic variables in the differential equations for "x." The variables "x" represent the variables that are affected by the constraints. The derivatives of the other class of differential variables, "y", represent the means by which the constraint are enforced.

For example, for a mechanical system subject to holonomic constraints, the constraints are expressed in coordinates, variables x, and are enforced by the constraint forces. By the Newton's law, the forces are connected to the acceleration, which plays the role of ẏ. Thus, y represents the velocities. If Equation 22c or 25c may be solved symbolically for "y" then "y" may be removed from system (22) or (25), respectively, so as to decouple the system. Accordingly, the remaining subsystems of the system form a DAE system with respect to the variables "x", "u", and "z". Thus, n algebraic equations are removed from the system.

Additionally, projection may also simplify Hessenberg Index-3 DAEs where the subsystem, $$0 = \dot{C}g + C\left[\frac{\partial g}{\partial t} + \frac{\partial g}{\partial x}g + \frac{\partial g}{\partial y}f\right] + \frac{\partial^2 h}{\partial t^2} + \frac{\partial^2 h}{\partial x \partial t}g,$$

(22d) or (25d), is solvable symbolically for "z."

If subsystem (22d) or (25d) is solvable for "z" symbolically, then subsystems (22a-22c) or (25a-25c) become DAE systems with respect to "x", "u" and "y" (or "x", "u" and "y"), respectively. By solving the subsystem (22d or 25d) symbolically and substituting the result into (22a-22c) or (25a-25c), respectively, k algebraic equations and k algebraic variables may be removed from the corresponding system.

The Projection Method and Higher Hessenberg Index DAEs

We generalize the approach from the previous section to DAEs of arbitrary Hessenberg index. We consider a Hessenberg index-(r+2) DAE $$\dot{y}_r = f_r(t, x, y_1, y_2, \ldots, y_r, z), \tag{26a}$$

$$\vdots$$

$$\dot{y}_2 = f_2(t, x, y_1, y_2, y_3), \tag{26b}$$

$$\dot{y}_1 = f_1(t, x, y_1, y_2), \tag{26c}$$

$$\dot{x} = g(t, x, y_1), \tag{26d}$$

$$0 = h(t, x), \tag{26e}$$

where $$\frac{\partial h}{\partial x}\frac{\partial g}{\partial y_1}\frac{\partial f_1}{\partial y_2} \ldots \frac{\partial f_{r-1}}{\partial y_r}\frac{\partial f_r}{\partial z} \text{ is nonsingular for all } t. \tag{27}$$

The vectors $y_1, y_2, \ldots, y_r$, are of size $m_1, m_2, \ldots, m_r$, respectively. Due to condition (27), the ranks of the Jacobins $$\frac{\partial g}{\partial y_1}, \frac{\partial f_1}{\partial y_2}, \ldots, \frac{\partial f_{r-1}}{\partial y_r}$$

and their products forming subproducts in condition (27) are at least k at any t. We re-order the components of the vectors $y_1, y_2, \ldots, y_r$, so that the first $j_1, j_2, \ldots, j_r$, components, respectively, denoted by superscript a, are such that $$\text{rank}\frac{\partial g}{\partial y_1} = \text{rank}\frac{\partial g}{\partial y_1^a} = j_1, \tag{28a}$$

$$\text{rank}\frac{\partial g}{\partial y_1}\frac{\partial f_1}{\partial y_2} = \text{rank}\frac{\partial g}{\partial y_1}\frac{\partial f_1}{\partial y_2^a} = j_2, \tag{28b}$$

$$\vdots$$

$$\text{rank}\frac{\partial g}{\partial y_1}\frac{\partial f_1}{\partial y_2} \ldots \frac{\partial f_{r-1}}{\partial y_r} = \text{rank}\frac{\partial g}{\partial y_1}\frac{\partial f_1}{\partial y_2} \ldots \frac{\partial f_{r-1}}{\partial y_r^a} = j_r. \tag{28c}$$

As in the previous cases the projection method leads to the representation $$\dot{x} = Du_1 + C^T v, \tag{29}$$

$$\text{where } C = \frac{\partial h}{\partial x}$$

is of maximal row-rank, D is of maximal column-rank and satisfies the relation $$CD = 0, \quad v = -(CC^T)^{-1}\frac{\partial h}{\partial t},$$

and $u_1$ is an (n−k)-dimensional vector. Then we introduce (n−k)-dimensional vectors $u_2, \ldots, u_r$ such that $$\dot{u}_1 = u_2, \tag{30a}$$

$$\dot{u}_2 = u_3, \tag{30b}$$

$$\vdots$$

$$\dot{u}_{r-1} = u_r, \tag{30c}$$

and we want to re-write equations (26) in terms of the projection of ẋ onto the tangential space, $u_1$, and its derivatives. We substitute equation (29) into equation (26d), obtaining $$Du_1 + C^Tv = g(t,x,y_1). \tag{31}$$

From condition (28a), it follows that equation (31) can be solved for $y_1^a$.

Differentiating equations (31) with respect to time, we obtain $$\dot{D}u_1 + D\dot{u}_2 + \dot{C}^Tv + C^T\dot{v} = \frac{\partial g}{\partial t} + \frac{\partial g}{\partial x}g + \frac{\partial g}{\partial y_1}f_1, \tag{32}$$

where we made use of equations (26d), (26c), and (30a). From condition (28b), it follows that equation (32) can be solved for $y_2^a$.

Differentiating equation (31) with respect to time second time, i.e. differentiating equation (32), and replacing derivatives of variables that occur in the left-hand side with their representation according to equations (29) and (30) and derivatives that occur in the right-hand side according to equations (26), we obtain algebraic equations that can be solved for $y_3^a$. We continue this process until we differentiate equation (31) r times. After each differentiation we make use of equations (29) and (30) in the left-hand side and of equations (26) on the right-hand side. The i-th differentiation gives us an algebraic equation, which due to conditions (28) can be solved for $y_{i+1}^a$, for i=1, ..., r−1.

The r-th differentiation gives us an equation, from which we derive a differential equation for $\dot{u}_r$ and an algebraic equation for z. Let us consider the result of r-th differentiation. We are interested only in the terms that define equations for $\dot{u}_r$ and z, and, therefore, for simplicity, we represent the result of r-th differentiation as follows:

$$D\dot{u}_r + \varphi_1(t, x, u_1, u_2, \ldots, u_r) = \frac{\partial g}{\partial y_1} \frac{\partial f_1}{\partial y_2} \frac{\partial f_2}{\partial y_3} \cdots \frac{\partial f_{r-1}}{\partial y_r} f_r + \varphi_2(t, x, y_1, y_2, \ldots, y_r), \quad (33)$$

where functions $\varphi_1$ and $\varphi_2$ represent the remaining terms, in which we are not interested.

If we project equation (33) onto the tangential space of the constraint manifold by multiplying both sides of the equation by $D^T$ on the left, we obtain an equation for $\dot{u}_r$.

$$\dot{u}_r = (D^T D)^{-1} D^T \left[ \frac{\partial g}{\partial y_1} \frac{\partial f_1}{\partial y_2} \frac{\partial f_2}{\partial y_3} \cdots \frac{\partial f_{r-1}}{\partial y_r} f_r + \varphi_2 - \varphi_1 \right]. \quad (34)$$

if we project equation (33) onto the normal space of the constraint manifold by multiplying both sides of the equation by C on the left, we obtain an equation for z, which is solvable due to condition (27) and is independent of $\dot{u}_r$ due to relation CD=0.

$$0 = (CC^T)^{-1} C \left[ \frac{\partial g}{\partial y_1} \frac{\partial f_1}{\partial y_2} \frac{\partial f_2}{\partial y_3} \cdots \frac{\partial f_{r-1}}{\partial y_r} f_r + \varphi_2 - \varphi_1 \right]. \quad (35)$$

The DAE system simplified by the projection method is then given by equations (29), (30), (31), (32), (34), (35), algebraic equations for $y_3^a, \ldots, y_r^a$ and differential equations for $y_1^d, \ldots, y_r^d$, where we represent each $y_i$ in terms of $y_i^a$ and $y_i^d$, for i=1, ..., r.

$$\dot{x} = Du_1 + C^T v, \quad (36a)$$

$$\dot{u}_1 = u_2, \quad (36b)$$

$$\dot{u}_2 = u_3, \quad (36c)$$

$$\vdots$$

$$\dot{u}_{r-1} = u_r, \quad (36d)$$

$$\dot{u}_r = (D^T D)^{-1} D^T \left[ \frac{\partial g}{\partial y_1} \frac{\partial f_1}{\partial y_2} \frac{\partial f_2}{\partial y_3} \cdots \frac{\partial f_{r-1}}{\partial y_r} f_r + \varphi_2 - \varphi_1 \right], \quad (36e)$$

$$\dot{y}_1^d = f_1^d, \quad (36f)$$

-continued $$\dot{y}_2^d = f_2^d, \quad (36g)$$

$$\vdots$$

$$\dot{y}_r^d = f_r^d, \quad (36h)$$

$$0 = Du_1 + C^T v - g, \quad (36i)$$

$$0 = \dot{D}u_1 + Du_2 + \dot{C}^T v + C^T \dot{v} - \frac{\partial g}{\partial t} - \frac{\partial g}{\partial x} g - \frac{\partial g}{\partial y_1} f_1, \quad (36j)$$

$$0 = \frac{d^3}{dt^3}(Du_1 + C^T v)\bigg|_{(29),(30)} - \frac{d^3}{dt^3}(g)\bigg|_{(26)}, \quad (36k)$$

$$\vdots$$

$$0 = \frac{d^{r-1}}{dt^{r-1}}(Du_1 + C^T v)\bigg|_{(29),(30)} - \frac{d^{r-1}}{dt^{r-1}}(g)\bigg|_{(26)}, \quad (36l)$$

$$0 = (CC^T)^{-1} C \left[ \frac{\partial g}{\partial y_1} \frac{\partial f_1}{\partial y_2} \frac{\partial f_2}{\partial y_3} \cdots \frac{\partial f_{r-1}}{\partial y_r} f_r + \varphi_2 - \varphi_1 \right]. \quad (36m)$$

System (36) consists of differential equations (36a)-(36h) with respect to $n+r(n-k)+(m_1-j_1)+(m_2-j_2)+ \ldots +(m_r-j_r)$ variables $x, u_1, \ldots, u_r, y_1^d, \ldots, y_r^d$ and of algebraic equations (36i)-(36m) with respect to $j_1+j_2+ \ldots +j_r+k$ variables $y_1^a, \ldots, y_r^a, z$. Note that index reduction alone yields an index-1 DAE with respect to $n+m_1+m_2+ \ldots +m_r$ differential and k algebraic variables.

FIGS. 1A-1B illustrate a general approach for simplifying a DAE of index of at least 3, in flow chart form. The DAE is received as an input (block 10), and converted to Hessenberg form and separated into three groups (block 12), including algebraic equations, level-zero (level-0) differential equations, and differential equations of levels 1 through r. Block 14 corresponds to separating the differential equations of levels 1 through r. In this example, level-1 corresponds to Equation 26c and level-r corresponds to Equation 26a. Block 16 corresponds to separating the differential equations of level 0, corresponding to Equation 26d, and block 18 corresponds to separating the algebraic manifold equations corresponding to Equation 26e.

The manifold equations, separated at block 18, are differentiated (block 20) and used to obtain an equation for the normal projection of x' onto a manifold v (block 22), for which v and bases for the normal and tangent spaces are determined (block 24), allowing determination of v as a function of t (block 26). This allows x' to be represented in terms of the projections onto normal (v) and tangent (u) spaces, indicated at block 28 (Equation 29). Formulae, denoted *, are then determined for x' in terms of unknown u and known v (block 30), the latter being a projection onto normal space that is used in the simplified DAE (block 64).

The equations for x' in terms of unknown u are substituted into the differential equations of level zero (block 32), giving an equation of the form shown in block 34 (Equation 31). The value of i is assigned to 1 (block 36), i is compared to r (block 38), and if i≦r, the formulae $A^i$ (block 40) are differentiated. Formulae from block 30 and equations from block 14 are substituted into the result of the differentiation of formulae $A^i$, giving formulae $A^{i+1}$. The value of i is incremented by 1 (block 48), and compared to r again (block 38).

If i>r, the formulae $A^{r+1}$ (Equation 33) obtained (block 42) are projected onto tangent space (block 58), giving equations for the r-th derivative of u (Equations 36e, the same as equations in block 62), and used in the simplified DAE (block 64). The equations $A^{r+1}$ obtained (block 42) are also projected onto normal space (block 56), giving algebraic equations for z (block 60, Equation (36m)), also used in the simplified DAE (block 64).

The components of $y_i$ that can be found from equations $A^i$ are called components $y_i^a$, and equations $A^i$ are algebraic equations for $y_i^a$. The remaining components of $y_i$ are called $y_i^d$ and we use the corresponding original differential equations for these components. In this way, the formulae $A^i$ (block 40) for which components of $y_i$ ($A^i$) can be solved algebraically (block 50) are identified, giving differential equations for $y_i^d$ (block 52, Equations 36f-36h) and algebraic equations for $y_i^a$ (block 54, Equations 36i-36l), and these are further used in the formulation of the simplified DAE (block 64).

Hence, a general approach includes transforming the differential algebraic equations into Hessenberg form, the Hessenberg form including a set of algebraic equations representing constraint manifold, and a set of differential equations of levels 0 through r, where r is greater or equal to 1. Algebraic equations of the manifold are differentiated so as to produce bases for normal and tangent spaces of the manifold and an equation for projection of the derivatives of 0th level differential variables onto the normal space. The derivatives $\dot{x}$ of the 0th level differential variables x are represented in terms of the projections onto the normal and tangent spaces (e.g. see Equation 29), substituting this representation whenever derivatives of 0th level differential variables are encountered so as to convert the 0th level differential equations into the 1st level algebraic equations (e.g. equations for $A^1$ in FIG. 1, block 34, and see also Equation 31 for the 1st level differential equations).

Level-1 differential variables $y_1$ for which the level-1 algebraic equations can and cannot be solved are identified, and only the level-1 differential equations for those level 1 differential variables for which level-1 algebraic equations cannot be solved are retained, so as to reduce the number of differential variables.

Level-1 algebraic equations are differentiated r−1 times, each time substituting differential equations of levels 1 through r−1, so as to obtain algebraic equations of levels 2 through r (e.g. equations ($A^i$) in the loop of the FIG. 1 for i=1 . . . r, the loop including blocks 38, 40, 44, 46, and 48) with respect to differential variables of levels 2 through r, respectively.

Differential variables of each level from 1 to r−1, $y_t$, . . . $y_{r-1}$, for which algebraic equations of the corresponding level can and cannot be solved are identified, and differential equations of the corresponding level for those variables for which algebraic equations of the corresponding level cannot be solved are kept, so as to reduce the number of differential variables.

Level-1 algebraic equations are then differentiated the r-th time (e.g. yielding Equation 33), substituting differential equations of levels 1 through r, and projecting the result onto normal and tangent spaces so as to obtain level-(r+1) algebraic equations for algebraic variables (e.g. block 60 in FIG. 1), and equations for the r-th derivative of the tangent projection of the derivative of level-0 differential variables, respectively, and thus to reduce the index of the DAE and number of differential variables.

For a method such as described above, if the level-0 algebraic equations are linear with respect to at least one of the level-0 differential variables, the method may further include considering a linear manifold defined by linear algebraic equations only, representing level-0 differential variables in terms of the projection to the linear manifold (its tangent space is the manifold itself) and to its normal space, using linear algebraic equations to find the normal projection of the level-0 differential variables, and rewriting differential equations of level 0 as differential equations for the projection of the level-0 differential variables onto the manifold so as to reduce the number of differential variables.

If algebraic equations of level i can be solved symbolically for some of the differential variables of level i, the method may further include a step of solving these equations and substituting them into the system so as to reduce the number of algebraic variables in the system.

If the algebraic equations of level r+1 can be solved symbolically for some of the algebraic variables, the general method may further include a step of solving these equations and substituting them into the system so as to reduce the number of algebraic variables in the system.

An example method of simplifying a system expressed as differential algebraic equations includes providing representations of the algebraic equations as a constrained manifold and determining the normal and tangential spaces of the manifold, transforming the DAE into Hessenberg form, reducing the Hessenberg form to an index of 1, and projecting the system onto the tangential and normal spaces of the manifold so as to reduce the number of algebraic and differential variables in the system.

Examples of the present invention may be implemented in a virtual engineering modeling environment, which may include a computer system comprising one or more of the following: a processor, memory component, user interface, input/output device, data buses providing communications between various components, and the like. A modeling environment may include a network of computers. An initial configuration of the modeling environment, such as a computer system, may include or receive an initial model of a physical system in terms of a DAE. The computer system may further allow test and verification of the physical system within the virtual engineering environment.

Examples of the present invention allow improved system modeling and virtual prototyping by replacing the initial model with a revised model in terms of ODEs, that may include fewer differential and/or algebraic parameters. This allows significantly faster computation of model predictions and behavior, and hence reduced prototyping time and faster product development.

Examples of the present invention include methods performed by a computer algebra system capable of symbolic mathematics, such as a virtual engineering environment. A virtual engineering environment may comprise one or more processors, memory components such as volatile and/or non-volatile memory components, and one or more communications interfaces such as a display, data entry components, and the like. A virtual engineering computer may be operable to numerically solve a DAE model of a physical system using approaches described herein.

The invention is not restricted to the illustrative examples described above. Examples described are not intended to limit the scope of the invention. Changes therein, other combinations of elements, and other uses will occur to those skilled in the art.

Modifications and variations of the present invention are possible in light of the above teachings and may be practiced otherwise than as specifically described while within the scope of the appended claims.

We claim:

1. In a computational environment having at least one computing system including at least one processor, a method of prototyping and testing a virtual model representing a physical system, wherein the method includes simplifying the model defined by a system of differential algebraic equations (DAEs) and not being in Hessenberg form, the method comprising:

transforming on at least one computing system the DAEs into Hessenberg form defining an index and having levels from level-0 through level-r, wherein r is a variable representing a level greater than zero, the Hessenberg form including algebraic equations representing a constraint manifold, and differential equations;

differentiating on at least one computing system the algebraic equations to produce bases for a normal space and a tangent space of the constraint manifold;

representing derivatives on at least one computing system of level-zero differential variables as projections onto the normal space and the tangent space of the constraint manifold, and substituting the projections into the level-zero differential equations, so as to reduce the number of differential variables and algebraic variables in the model of the physical system;

converting on at least one computing system the level-zero differential equations into level-1 algebraic equations by representing derivatives of the level-zero differential variables in terms of the projections onto the normal and tangent spaces;

retaining on at least one computing system only the level-1 differential equations corresponding to level-1 differential variables for which level-1 algebraic equations cannot be solved;

differentiating on at least one computing system the level-1 algebraic equations r−1 times, each time substituting differential equations of levels 1 through r−1, so as to obtain algebraic equations of levels 2 through r with respect to differential variables of levels 2 through r, respectively, keeping only differential equations for which algebraic equations of the corresponding level cannot be solved;

differentiating on at least one computing system the level-1 algebraic equations again, substituting differential equations of levels 1 through r to generate a result, and projecting the result onto normal and tangent spaces so as to obtain level-(r+1) algebraic equations for algebraic variables and equations for the r-th derivative of the tangent projection of the derivative of level-0 differential variables, respectively;

wherein the model of the physical system is simplified by reducing the index of the DAE and by reducing the number of differential variables in the model of the physical system; and wherein the simplified model of the physical system generates parameters for designing of a prototype and virtual testing effecting the physical system determined by variation of variables of the model.

2. The method of claim 1, wherein level-zero algebraic equations are linear with respect to at least one of the level-zero differential variables, the method further including:

establishing a linear manifold defined by linear algebraic equations only;

representing level-zero differential variables in terms of projections to the linear manifold and to normal space;

using linear algebraic equations to find the normal projection of the level-zero differential variables; and rewriting level-zero differential equations as differential equations for the projection of the level-zero differential variables onto the linear manifold, so as to reduce the number of differential variables in the model of the physical system.

3. The method of claim 1, wherein the algebraic equations of a defined level are solved symbolically for at least one of the differential variables of the defined level, the method further including solving the algebraic equations so as to reduce the number of algebraic variables in the system.

4. The method of claim 3, wherein algebraic equations of level r+1 are solved symbolically for at least one of the algebraic variables, the method further including solving the algebraic equations so as to reduce the number of algebraic variables in the system.

5. The method of claim 4, the method removing all algebraic variables and at least one differential variable from the model of the physical system.

6. The method of claim 1, the DAEs having levels from level-0 through level-r, where r>1.

7. The method of claim 1, the computational environment being an engineering computer configured to perform symbolic mathematics.

8. The method of claim 1, wherein the physical system is a mechanical system.

9. The method of claim 8 wherein the mechanical system is an engine model.

10. The method of claim 1 wherein the physical system is an electrical system.

11. The method of claim 10 wherein the electrical system is an electrical circuit model.

* * * * *